United States Patent
Lin et al.

(10) Patent No.: US 11,976,374 B2
(45) Date of Patent: May 7, 2024

(54) METHOD AND DEVICE OF REMOVING AND RECYCLING METALS FROM MIXING ACID SOLUTION

(71) Applicant: MEGA UNION TECHNOLOGY INCORPORATED, Taoyuan (TW)

(72) Inventors: Kuo-Ching Lin, Taoyuan (TW); Yung-Cheng Chiang, Taoyuan (TW); Shr-Han Shiu, Taoyuan (TW); Wei-Rong Tey, Taoyuan (TW); Yu-Hsuan Li, Taoyuan (TW)

(73) Assignee: MEGA UNION TECHNOLOGY INCORPORATED, Taoyuan (TW)

( * ) Notice: Subject to any disclaimer, the term of this patent is extended or adjusted under 35 U.S.C. 154(b) by 821 days.

(21) Appl. No.: 17/017,337

(22) Filed: Sep. 10, 2020

(65) Prior Publication Data
US 2022/0002891 A1    Jan. 6, 2022

(30) Foreign Application Priority Data
Jul. 1, 2020    (TW) ................................. 109122294

(51) Int. Cl.
| | |
|---|---|
| C25C 7/00 | (2006.01) |
| B01J 39/05 | (2017.01) |
| B01J 39/18 | (2017.01) |
| B01J 47/02 | (2017.01) |
| C01G 51/00 | (2006.01) |
| C25C 1/08 | (2006.01) |

(52) U.S. Cl.
CPC ................. *C25C 1/08* (2013.01); *B01J 39/05* (2017.01); *B01J 39/18* (2013.01); *B01J 47/02* (2013.01); *C01G 51/003* (2013.01)

(58) Field of Classification Search
CPC .... C25C 1/08; C25C 1/00; B01J 39/05; B01J 39/18; B01J 47/02; C01G 51/003
See application file for complete search history.

(56) References Cited

U.S. PATENT DOCUMENTS

| | | | | |
|---|---|---|---|---|
| 2008/0105620 A1* | 5/2008 | Hicks | ........................ | C02F 9/20 |
| | | | | 210/284 |
| 2013/0233786 A1* | 9/2013 | Posa | ..................... | E21B 21/065 |
| | | | | 210/259 |
| 2018/0079663 A1* | 3/2018 | Miyamoto | ................ | C25C 7/00 |

* cited by examiner

*Primary Examiner* — Zulmariam Mendez
(74) *Attorney, Agent, or Firm* — MUNCY, GEISSLER, OLDS & LOWE, P.C.

(57) ABSTRACT

A method and device of removing and recycling metals from a mixing acid solution, includes adsorbing a mixing acid solution with a pH value of −1 to 4 and a cobalt ion concentration of 100 to 1,000 mg/L by at least two cation resins in series setting to the cobalt ion concentration in the mixing acid solution is less than 10 mg/L, and then adjusting the pH value of the mixing acid solution after adsorption to meet a discharge standard, wherein the particle size of the at least two cation resins in series setting is 150~1,200 μm. After the cation resins are saturated by adsorption, regenerating the cation resins by sulfuric acid to form a cobalt sulfate solution, and then electrolytically treating the cobalt sulfate solution to obtain electrolytic cobalt and sulfuric acid electrolyte. The operation process is simple without complicated equipment, and it can effectively recycle metals from mixing acid solutions. The cationic resin and sulfuric acid solution can also be reused, so the method of the present invention has environmental and economic benefits.

11 Claims, 5 Drawing Sheets

METHOD AND DEVICE OF REMOVING AND RECYCLING METALS FROM MIXING ACID SOLUTION

BACKGROUND OF THE INVENTION

1. Field of the Invention

The present invention relates to a method for removing and recovering metals from a mixing acid solution, particularly to a method for removing and recovering cobalt metal from a strongly acidic mixed acid solution.

2. Description of the Prior Art

Generally, in the manufacturing of electronic parts involving heavy metals such as wafers and circuit boards, in the production of electronic components such as wafers or circuit boards, many processes such as electroplating and etching will produce a large amount of metal-containing acid. This type of waste liquid has strong acidity and contains heavy metals such as copper, cobalt, nickel, zinc and iron. Due to lower pH and large amount of heavy metal components, acidic heavy metal wastewater is more harmful to the environment than ordinary heavy metal wastewater.

A traditional neutralization precipitation method is used to treat strong acid wastewater, which has problems such as high cost, limited recovery efficiency, and secondary pollution. At the same time, heavy metals as an important non-renewable resource, are widely used in various fields of industrial production and national economic development, and their demand shows the importance and necessity of recycling heavy metals from heavy metal wastewater.

The conventional separation and removal methods of heavy metals mainly include solvent extraction and crystallization, but the solvent extraction has high cost and the crystallization has high energy consumption. The ion adsorption method has many advantages such as good adsorption effect, high separation efficiency, simple operation and reusability. However, this method still has the following problems in the separation of heavy metals in strong acid wastewater: the competition between high concentration of hydrogen ions and metal ions in adsorbing treatment, the competition and mutual interference between multiple heavy metal ions in adsorbing treatment. Furthermore, the adsorption capacity of most cation resins for mixing acid solutions with a pH value of less than 0.5 will be greatly reduced.

SUMMARY OF THE INVENTION

In order to solve the problem that the prior art cannot recover multiple heavy metals from strong acid wastewater, the present invention provides a method for removing and recovering heavy metals from a strongly acidic mixed acid solution by two or more acid-resistant cation resins in series setting, which used for separating multiple heavy metal ions from the mixing acid solution, effectively reduce the concentration of heavy metal ions in the discharged acidic wastewater, and the resins after adsorption treatment are regenerated with sulfuric acid. The metal sulfuric acid solution formed in the regeneration treatment can be electrolytic treated to recover heavy metals. The present invention can realize the resource utilization of acidic wastewater, and it has significant environmental and economic benefits.

The present invention proposes a method of removing and recycling metals from a mixing acid solution, which comprises adsorbing the mixing acid solution with a pH value of −1 to 4 and a cobalt ion concentration of 100 to 1,000 mg/L by at least two cation resins in series setting to the cobalt ion concentration in the mixing acid solution is less than 10 mg/L, and generating the at least two cation resins in series setting with 5-20% sulfuric acid to form a sulfuric acid regeneration solution with a cobalt ion concentration of 200-1,000 mg/L after the at least two cation resins in series setting are saturated.

In above method, adjusting the pH value of the mixing acid solution after adsorption treatment to 6-9 to meet the emission standard.

In above method, the mixing acid solution with the pH value of −1 to 2 and the cobalt ion concentration of 400 to 1,000 mg/L.

In above method, the mixing acid solution further comprises 5-100 mg/L copper ion, 5-100 mg/L aluminum ion or 1-30 mg/L ruthenium ion.

In above method, the mixing acid solution is composed of 50~80 wt % phosphoric acid, 5~15 wt % acetic acid, 5~15 wt % nitric acid and 0~40% water.

In above method, the mixing acid solution is adsorbed by three cation resins in series setting with sulfonic acid functional groups.

In above method, a flow rate of adsorption treatment is 0.5~12BV/h, and a flow rate of regeneration treatment is 0.5~6BV/h.

In above method, further comprises a step of electrolytically treating the sulfuric acid regeneration solution to obtain an electrolytic cobalt and a sulfuric acid electrolyte with a cobalt ion concentration of 100-200 mg/L.

The present invention proposes a device of removing and recycling metals from a mixing acid solution, which comprises at least two cation resins in series setting for adsorbing the mixing acid solution with a pH value of −1~4 and a cobalt ion concentration of 100~1,000 mg/L until the cobalt ion concentration is less than 10 mg/L, wherein a particle size of the at least two cation resins in series setting is 150 to 1,200 μm.

Below, embodiments are described in cooperation with the attached drawings to make easily understood the objectives, technical contents, characteristics and accomplishments of the present invention.

DESCRIPTION OF THE PREFERRED EMBODIMENTS

Figure 1:
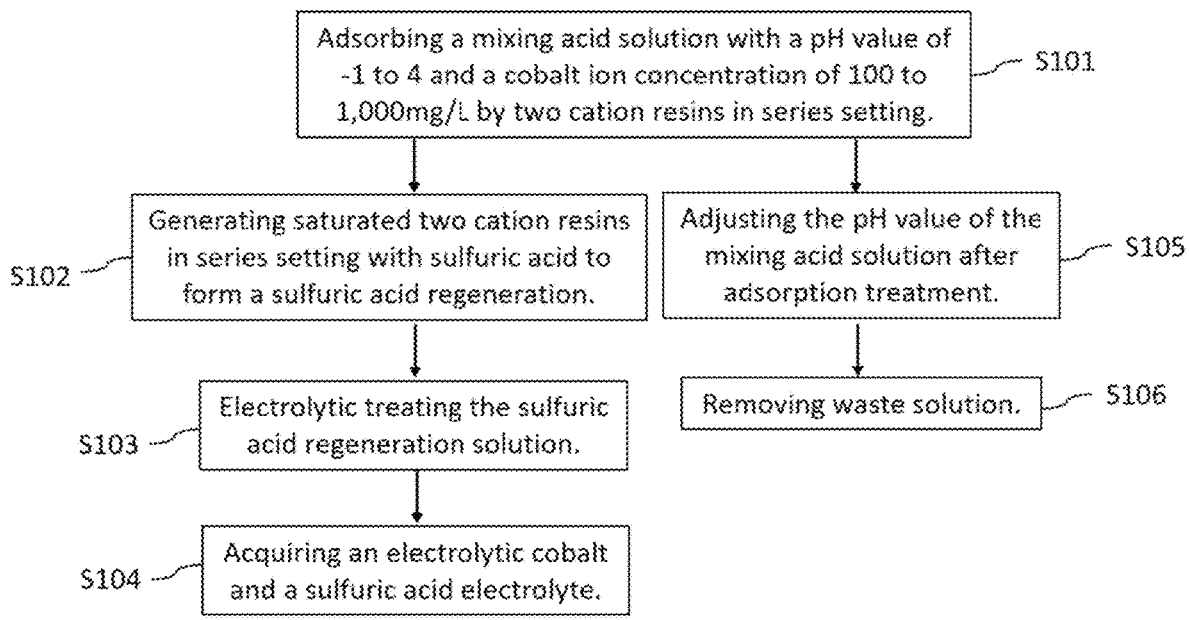
FIG. 1 is a flow chart of the method for removing and recovering cobalt metal from a mixing acid solution according to the present invention.

The present invention will be described in detail with embodiments and attached drawings below. However, these embodiments are only to exemplify the present invention but not to limit the scope of the present invention. In addition to the embodiments described in the specification, the present invention also applies to other embodiments. Further, any modification, variation, or substitution, which can be easily made by the persons skilled in that art according to the embodiment of the present invention, is to be also included within the scope of the present invention, which is based on the claims stated below. Although many special details are provided herein to make the readers more fully understand the present invention, the present invention can still be practiced under a condition that these special details are partially or completely omitted. Besides, the elements or steps, which are well known by the persons skilled in the art, are not described herein lest the present invention be limited unnecessarily. Similar or identical elements are denoted with similar or identical symbols in the drawings. It should be noted: the drawings are only to depict the present invention schematically but not to show the real dimensions or quantities of the present invention. Besides, matterless details are not necessarily depicted in the drawings to achieve conciseness of the drawings.

Refer to FIG. 1. The flow chart of the method for removing and recovering heavy metals from a mixing acid solution of the present invention. Step S101: Introduce a mixing acid solution containing heavy metal ions through at least two cation resins in series setting for adsorption treatment. In one embodiment, at a general ambient temperature, such as 25° C., the mixing acid solution with a pH value of −1 to 4 and a cobalt ion concentration of 100 to 1,000 mg/L, wherein a flow rate of adsorption treatment is 0.512 Bed volume/h (BV/h), and the cobalt ion concentration in the mixed acid solution after adsorption treatment is less than 10 mg/L. Preferably, at a temperature of 25° C., the mixing acid solution with the pH value of −1 to 2 and the cobalt ion concentration of 400 to 1,000 mg/L. Optionally, the mixing acid solution can be adjusted or stored in an adjustment tank or a buffer tank before the adsorption treatment.

Refer to FIG. 1 again. The saturated at least two cation resins in series setting can be regenerated by strong acid and heavy metal ions can be recovered. When the at least two cation resins in series setting are saturated after adsorption treatment, introduce 5-20% sulfuric acid through the at least two cation resins in series setting for regeneration treatment to form a sulfuric acid regeneration solution with a cobalt ion concentration of 200 to 1,000 mg/L. A flow rate of regeneration treatment is 0.5~6BV/h, and the regeneration operation temperature is room temperature 25° C., as shown in step S102. The at least two cation resins in series setting after sulfuric acid regeneration treatment can be washed with water to neutrality for reusing with good metal removal efficiency. Finally, the sulfuric acid regeneration solution is electrolytically treated to obtain an electrolytic cobalt and a sulfuric acid electrolyte with a concentration of cobalt ion of 100-200 mg/L, as shown in steps S103 and S104.

Refer to FIG. 1 again. Adjusting the pH value of the mixing acid solution after adsorption treatment to 6-9 to meet the emission standard, and then removing the waste solution, as shown in steps S105 and S106.

The mixing acid solution that can be processed by the method of the present invention is not limited to that shown in FIG. 1. In one embodiment, the metal ions in the mixing acid solution may be two or more metal ions comprising cobalt ions. For example, the mixing acid solution further comprises 5-100 mg/L copper ion, 5-100 mg/L aluminum ion or 1-30 mg/L ruthenium ion. Secondly, the mixing acid solution is composed of 50~80 wt % phosphoric acid, 5~15 wt % acetic acid, 5~15 wt % nitric acid and 0~40% water, as shown in Table 1 below. Therefore, in this embodiment, after the adsorption of the at least two cation resins in series setting, the concentration of copper, aluminum, and ruthenium ions in the mixing acid solution is less than 0.1 ppm, 0.1 ppm, and 2.3 ppb, respectively.

TABLE 1

| Item | Phosphoric acid (wt %) | Acetic acid (wt %) | Nitric acid (wt %) | Water (wt %) |
| --- | --- | --- | --- | --- |
| Group 1 | 60~80 | 5~10 | 5~10 | 0~30 |
| Group 2 | 60~70 | 5~10 | 5~10 | 10~30 |
| Group 3 | 50~60 | 10~15 | 10~15 | 10~30 |
| Group 4 | 50~60 | 5~10 | 5~10 | 20~40 |

Figure 2:
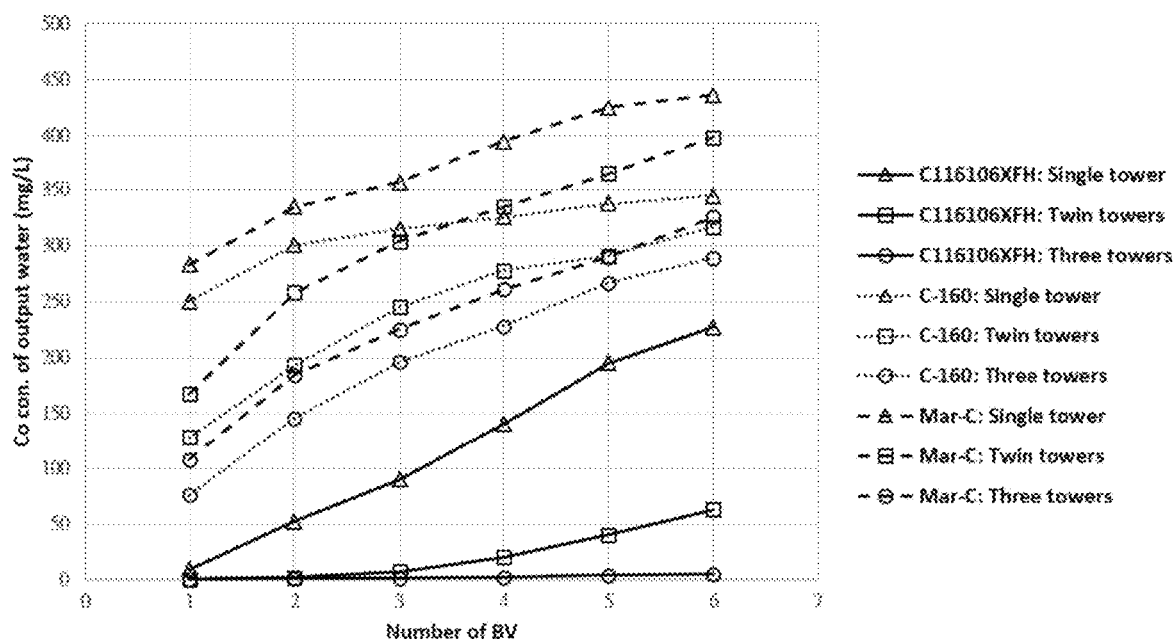
FIG. 2 is a curve graph showing the adsorption capacity of C116106XFH, C-160 and Mar-C resins in setting of single tower, twin towers and three towers. The pH value of the acidic waste solution is −1 and the initial concentration of cobalt ion is 430 mg/L.
Figure 3:
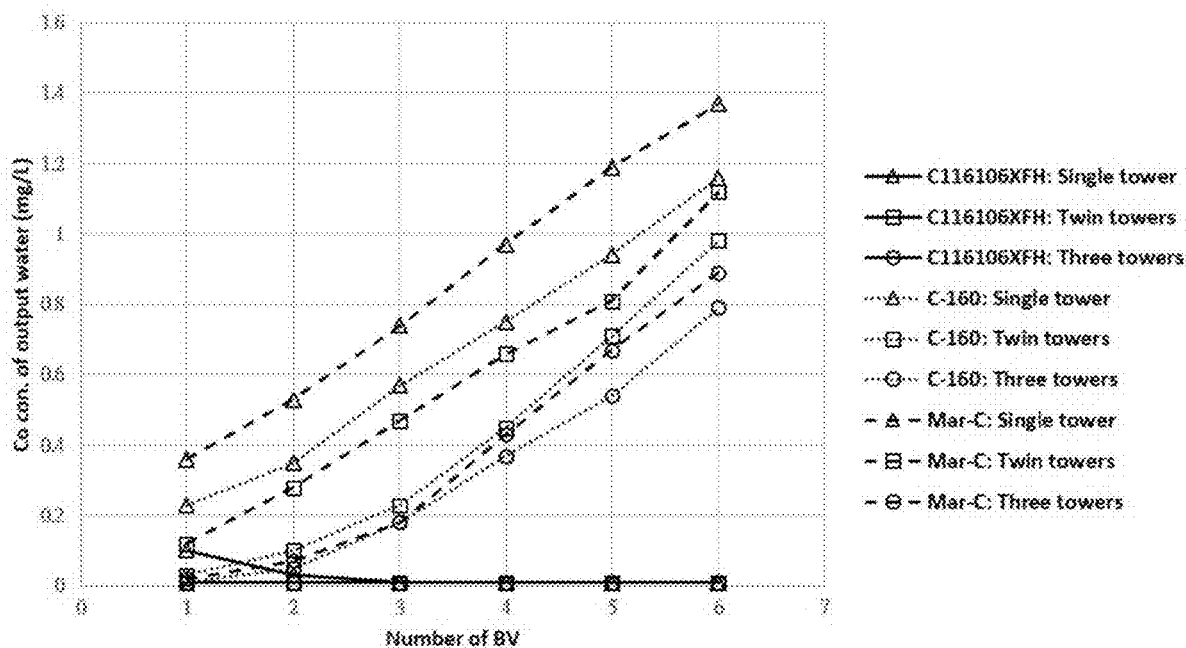
FIG. 3 is a curve graph showing the adsorption capacity of C116106XFH, C-160 and Mar-C resins in setting of single tower, twin towers and three towers. The pH value of the acidic waste solution is 2 and the initial concentration of cobalt ion is 430 mg/L.
Figure 4:
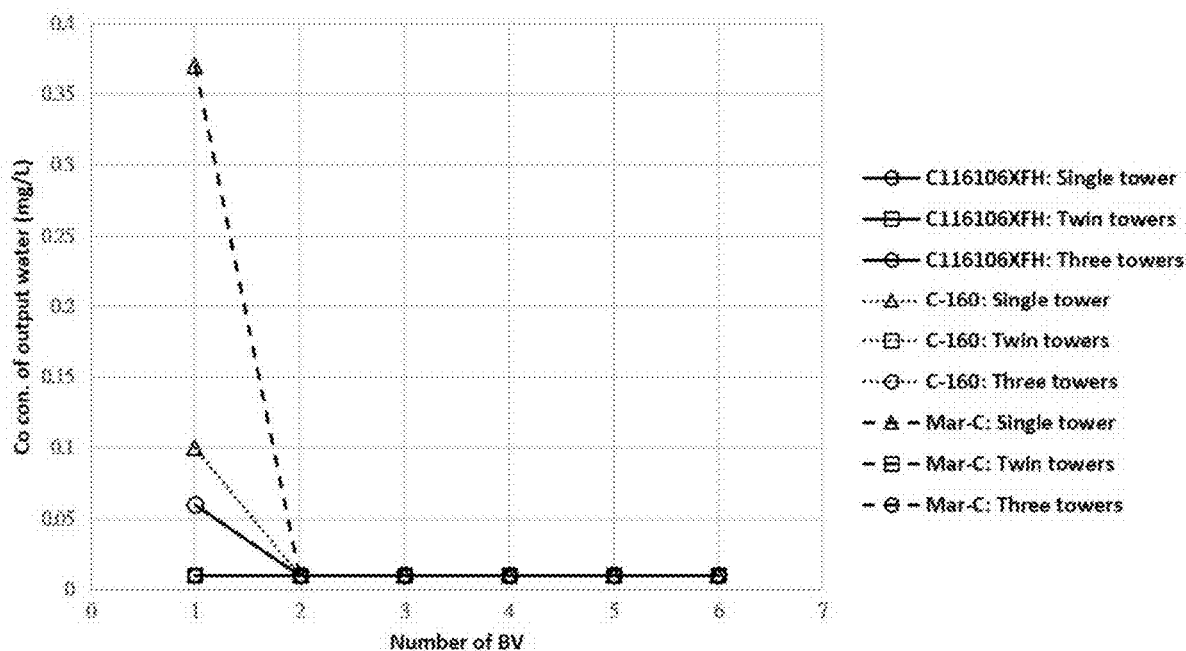
FIG. 4 is a curve graph showing the adsorption capacity of C116106XFH, C-160 and Mar-C resins in setting of single tower, twin towers and three towers. The pH value of the acidic waste solution is 4 and the initial concentration of cobalt ion is 430 mg/L.

In one embodiment, the cation resins in the present invention have sulfonic acid functional groups, such as Purolite® C116106XFH strong acid cationic resin in the form of hydrogen ions. Refer to FIG. 2, FIG. 3 and FIG. 4, which are curve graphs showing the adsorption capacity of C116106XFH, C-160 (Control 1) and Mar-C(Control 2) resins in setting of single tower, twin towers and three towers, wherein pH values of the mixing acid solution are respectively −1, 2 and 4, and the initial concentration of cobalt ion is 430 mg/L.

Refer to FIG. 2, for the mixing acid solution with the pH value of −1 and the amount of output water is 1~6BV, the cobalt ion concentration of output water of C116106XFH resin is lower than that of C-160 and Mar-C resin. Cobalt ion concentration of output water produced by three towers is lower than that of single tower and twin towers. Among them, the cobalt ion concentration of output water produced by three C116106XFH resins in series setting can be reduced to less than 10 mg/L. As the amount of output water increases, it can still maintain a very low level of cobalt ion concentration in output water. For Control 1 and Control 2 resins in series setting, the more amount of input water flows through, their cobalt ion concentrations in output water are higher. In a mixing acid environment, the heavy metal ion adsorption capacity of C116106XFH resin is better than that of C-160 and Mar-C resins, and the greater the number of series, the better the adsorption capacity.

Refer to FIG. 3, for the mixing acid solution with the pH value of 2 and the amount of output water is 3~6BV, the cobalt ion concentration of output water of C116106XFH resin is lower than that of C-160 and Mar-C resin. Cobalt ion concentrations of output water produced by single tower, twin towers and three towers are equivalent, less than 0.05 mg/L. As the amount of output water increases, all can still maintain a very low level of cobalt ion concentration in output water. For Control 1 and Control 2 resins in series setting, the more amount of input water flows through, their cobalt ion concentrations in output water are higher. All three kind of resins have better adsorption capacity when the pH value is 2 than −1, wherein the adsorption capacity of heavy metal ions of C116106XFH resin is better than that of C-160 and Mar-C resin. For single tower, twin towers and three towers, three of adsorption capacity are equivalent.

For the phenomenon that cobalt ion concentrations in 1~2BV output water is higher than in 3~6BV output water, due to pores in a new resin are not completely wet during the initial operation, functional groups in these pores cannot be ion-exchanged with heavy metal ions in the mixing acid solution, resulting in a higher concentration of heavy metal ions in output water. When the resin is operated for a while to completely wet the pores, the concentration of heavy metal ions in the output water will decrease. Therefore, concentration values of 3~6BV output water are more reference.

Refer to FIG. 4, for the mixing acid solution with the pH value of 4 and the amount of output water is 2~6 BV, cobalt ion concentrations of output water of C116106XFH, C-160 and Mar-C resin are equivalent, even these cobalt ion concentrations of output water produced by single tower, twin towers and three towers, less than 0.05 mg/L. As the amount of output water increases, all can still maintain their cobalt ion concentrations of output water at very low level. When the pH value is 4, the resin type, quantity, and series setting have no major influence for the adsorption capacity. Therefore, according to above-mentioned embodiments, at least two cation resins in series setting can significantly reduce the cobalt ion concentration in strongly acidic output water, and preferably for C116106XFH strong acid cation resin, it can effectively maintain the cobalt ion concentration of output water at low level, which is beneficial to the flexibility of parameter adjustment in the process of removing heavy metal ions.

Figure 5:
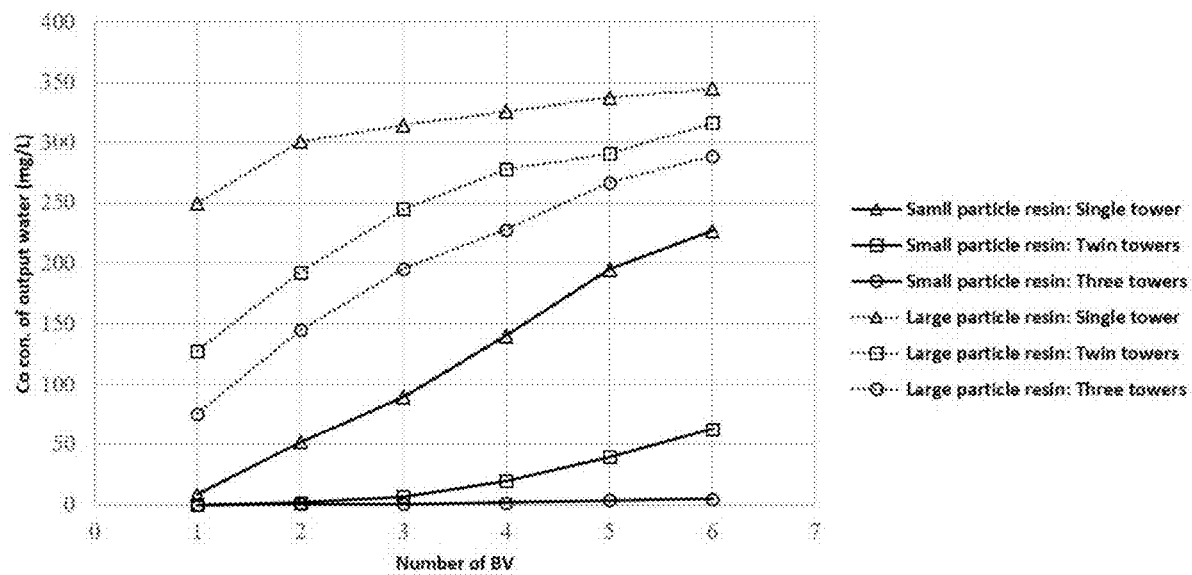
FIG. 5 is a curve graph showing the adsorption capacity of small and large particle size resins in setting of single tower, twin towers and three towers. The pH value of the acidic waste solution is −1 and the initial concentration of cobalt ion is 430 mg/L.
Figure 6:
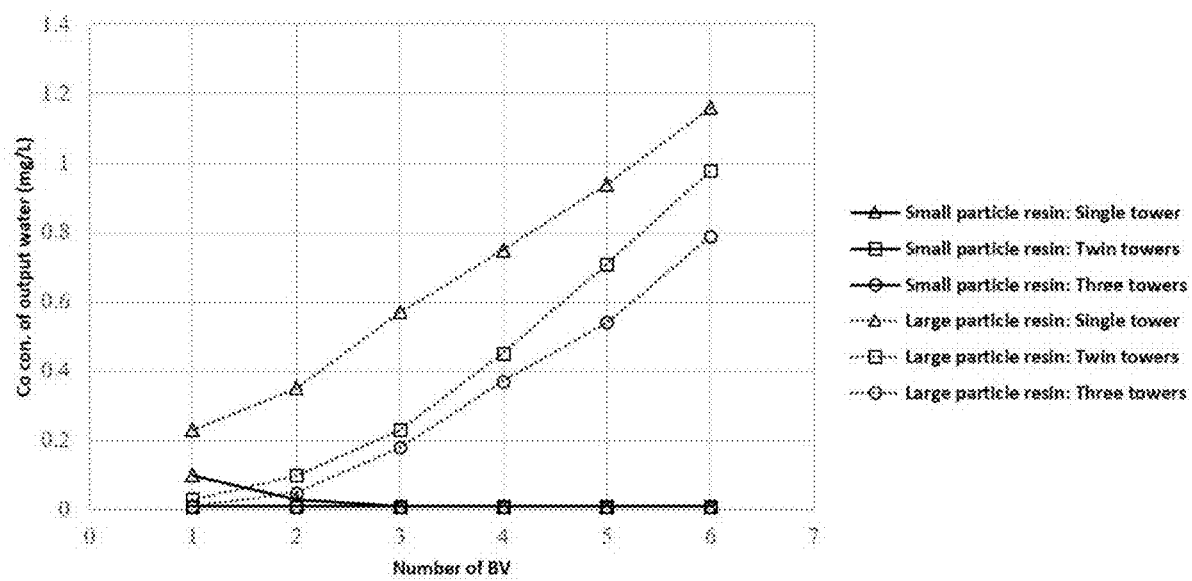
FIG. 6 is a curve graph showing the adsorption capacity of small and large particle size resins in setting of single tower, twin towers and three towers. The pH value of the acidic waste solution is 2 and the initial concentration of cobalt ion is 430 mg/L.
Figure 7:
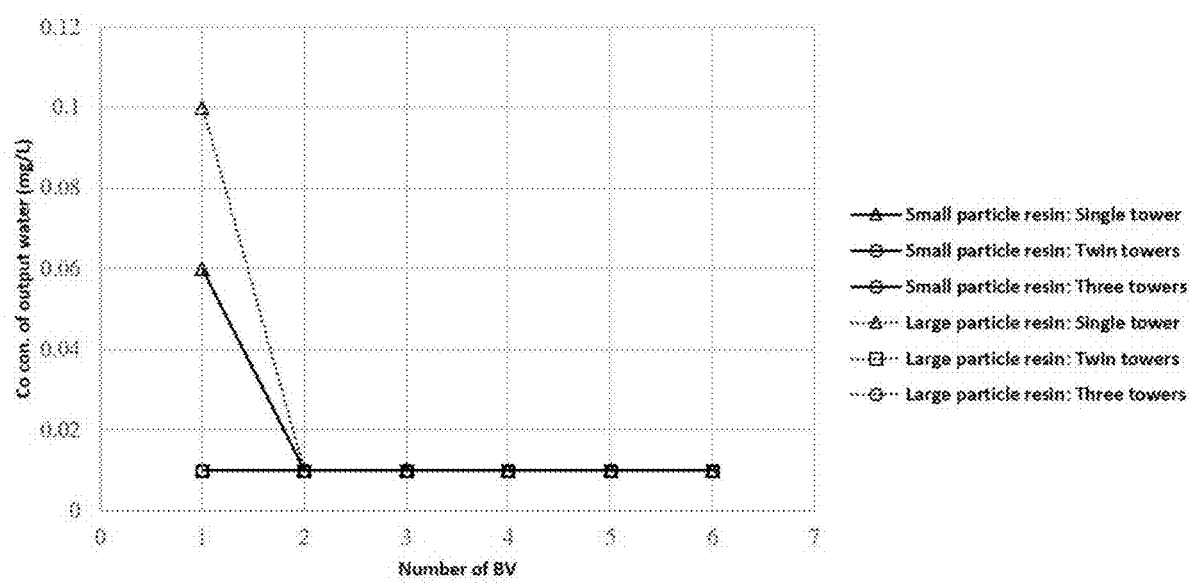
FIG. 7 is a curve graph showing the adsorption capacity of small and large particle size resins in setting of single tower, twin towers and three towers. The pH value of the acidic waste solution is 4 and the initial concentration of cobalt ion is 430 mg/L.

Refer to FIG. 5, FIG. 6 and FIG. 7, which are curve graphs showing the adsorption capacity of small and large particle size resins in setting of single tower, twin towers and three towers, wherein pH values of the mixing acid solution are respectively −1, 2 and 4, and the initial concentration of cobalt ion is 430 mg/L.

Refer to FIG. 5, for the mixing acid solution with the pH value of −1 and the amount of output water is 1~6 BV, the cobalt ion concentration of output water of the small particle size resin is lower than that of the larger particle size resin. The cobalt ion concentration of output water in setting of three towers is lower than that of single tower and twin towers. Among them, for the small particle size resin in setting of three towers, its cobalt ion concentration of output water can be reduced to less than 10 mg/L, and as the amount of output water increases, it can still maintain at very low level. However, except the small particle size resins in setting of three towers, as the amount of output water increases, cobalt ion concentrations of other settings are higher. In a mixing acid environment, the heavy metal ion adsorption capacity of the small particle size resin is better than that of the large particle size resin, and the greater the number of series, the better the adsorption capacity.

Refer to FIG. 6, for the mixing acid solution with the pH value of 2 and the amount of output water is 3~6 BV, the cobalt ion concentration of output water of the small particle size resin is lower than that of the larger particle size resin. Cobalt ion concentrations of output water in setting of single tower, twin towers and three towers are equivalent, less than 0.05 mg/L, and as the amount of output water increases, all can still maintain their cobalt ion concentrations of output water at very low level. For the large particle size resin, as the amount of output water increases, cobalt ion concentrations of output water is higher. Both the small particle size and the large particle size resin have better adsorption capacity when the pH value is 2 than −1, wherein the heavy metal ion adsorption capacity of the small particle size resin is better than that of the large particle size resin. For the small particle size resin(s) in setting of single tower, twin towers and three towers, three of adsorption capacity are equivalent.

Refer to FIG. 7, for the mixing acid solution with the pH value of 4 and the amount of output water is 2~6 BV, cobalt ion concentrations of output water of the small particle size and large particle size resin are equivalent, even these cobalt ion concentrations of output water produced by single tower, twin towers and three towers, less than 0.02 mg/L. As the amount of output water increases, all can still maintain their cobalt ion concentrations of output water at very low level. When the pH value is 4, the resin particle size, quantity, and series setting have no major influence for the adsorption capacity.

Figure 8:
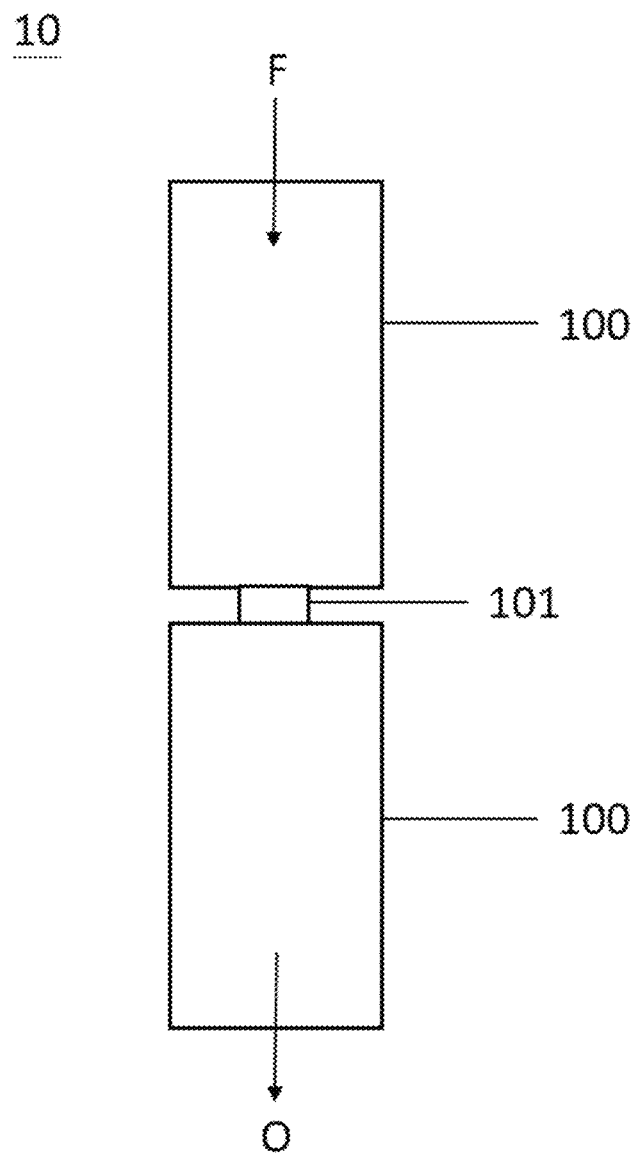
FIG. 8 is a schematic diagram of the device for removing and recovering cobalt metal from a mixing acid solution according to the present invention.

Refer to FIG. 8, which is a schematic diagram of the device 10 for removing and recovering cobalt metal from a mixing acid solution according to the present invention. In this embodiment, at least two cation resins 100 are arranged in series setting or connected tandemly by the connecting pipe 101. A mixing acid solution can be introduced from a fluid inlet F of one of the at least two cation resins 100 to another cation resin 100 directly or through the connecting pipe 101. The mixing acid solution after treatment, flows out from a fluid outlet O of another cationic resin 100, wherein the particle size of the at least two cation resins 100 is 150 to 1,200 μm, preferably 150 to 300 μm. In other embodiments, three cation resins 100 are arranged in series setting or connected tandemly by the connecting pipe 101, wherein the three cationic resins 100 can be different models and different particle sizes, which depend on requirements.

In summary, when a pH value of pre-treated water is lower, resins in series setting have better heavy metal ion adsorption capacity. On the contrary, when the pH value of treated water is higher, the resin type, quantity and series setting have no major influence for the heavy metal ion adsorption capacity. Therefore, the present invention provides a method of connecting at least two strong acid cation resins, which can effectively remove cobalt, copper, aluminum, and ruthenium ions from a mixing acid solution. Saturated cation resins after adsorption can be regenerated with sulfuric acid to form a sulfuric acid regeneration solution, which can be electrolyzed to acquire metal. It has environmental protection and economic benefits.

What is claimed is:
1. A method of removing and recycling metals from a mixing acid solution, comprises:
adsorbing the mixing acid solution with a pH value of −1 to 4 and a cobalt ion concentration of 100 to 1,000 mg/L by at least two cation resins in series setting to the cobalt ion concentration in the mixing acid solution is less than 10 mg/L; and generating the at least two cation resins in series setting with 5-20% sulfuric acid to form a sulfuric acid regeneration solution with a cobalt ion concentration of 200-1,000 mg/L after the at least two cation resins in series setting are saturated.

2. The method according to claim 1, further comprising a step of adjusting the pH value of the mixing acid solution after adsorption treatment to 6-9.

3. The method according to claim 1, wherein the mixing acid solution with the pH value of −1 to 2 and the cobalt ion concentration of 400 to 1,000 mg/L.

4. The method according to claim 1, wherein the mixing acid solution further comprises 5-100 mg/L copper ion, 5-100 mg/L aluminum ion or 1-30 mg/L ruthenium ion.

5. The method according to claim 1, wherein the mixing acid solution is composed of 50~80 wt % phosphoric acid, 5~15 wt % acetic acid, 5~15 wt % nitric acid and 0~40% water.

6. The method according to claim 1, wherein the mixing acid solution is adsorbed by three cation resins in series setting with sulfonic acid functional groups.

7. The method according to claim 1, wherein a flow rate of adsorption treatment is 0.5~12BV/h, and a flow rate of regeneration treatment is 0.5~6BV/h.

8. The method according to claim 1, further comprising a step of electrolytically treating the sulfuric acid regeneration solution to obtain an electrolytic cobalt and a sulfuric acid electrolyte with a cobalt ion concentration of 100-200 mg/L.

9. A device of removing and recycling metals from a mixing acid solution, comprises:

at least two cation resins in series setting for adsorbing heavy metal ions of the mixing acid solution with a pH value of 1-4 and a cobalt ion concentration of 100-1,000 mg/L until the cobalt ion concentration is less than 10_mg/L, wherein a particle size of the at least two cation resins in series setting is 150 to 1,200 μm, wherein the mixing acid solution is composed of 50-80 wt % phosphoric acid, 5-15 wt % acetic acid, 5-15 wt % nitric acid and 0-40% water.

10. The device according to claim 9, wherein the particle size of the at least two cation resins in series setting is 150 to 300 μm.

11. The device according to claim 9, wherein the mixing acid solution further comprises 5-100_mg/L copper ion, 5-100_mg/L aluminum ion or 1-30_mg/L ruthenium ion.

\* \* \* \* \*